Patented Apr. 16, 1929.

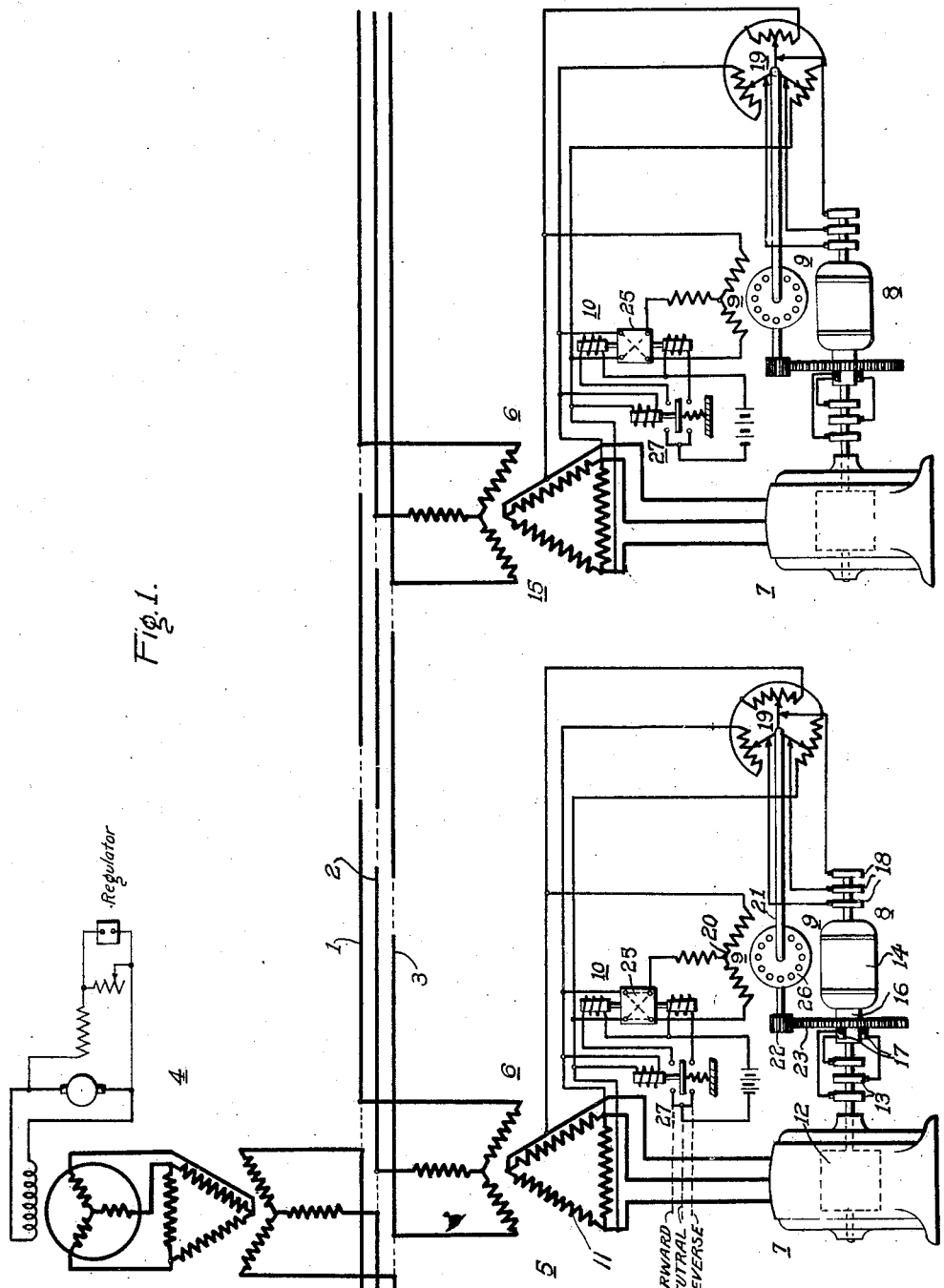

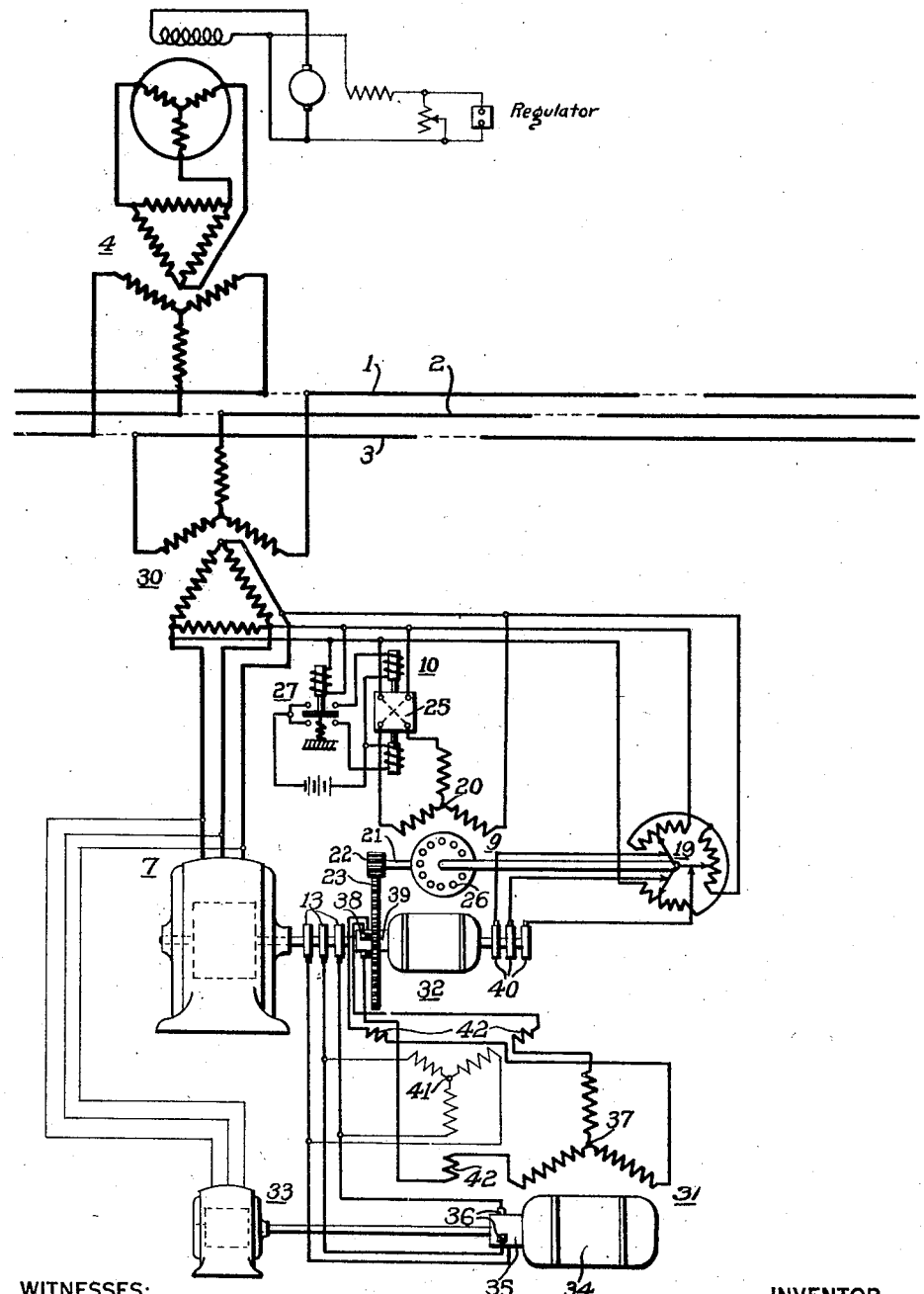

1,709,665

UNITED STATES PATENT OFFICE.

RUDOLF E. HELLMUND, OF PITTSBURGH, PENNSYLVANIA, ASSIGNOR TO WESTINGHOUSE ELECTRIC & MANUFACTURING COMPANY, A CORPORATION OF PENNSYLVANIA.

TRANSMISSION SYSTEM.

Application filed December 13, 1923. Serial No. 680,400.

My invention relates to electrical power transmission lines or systems, and particularly to those for the transmission of power at high voltages over long distances.

In the copending application of Frank G. Baum, Serial No. 569,704, filed June 20, 1922, patented February 8, 1927, No. 1,617,007, is shown a system that is particularly adapted to high-voltage, long-distance transmission of electrical power, this system embodying a plurality of synchronous condensers spaced along the line and adapted to provide the wattless current required in each section of the line between condenser stations, whereby a substantially constant voltage may be maintained throughout a relatively long transmission line.

Under certain load conditions, the synchronous condensers may tend to become unstable in their operation, that is, oscillations or hunting may be set up, and corresponding surges of voltage may occur in the transmission line.

One object of my invention, therefore, is to provide a system of this general character, but embodying asynchronous motors so controlled as to prevent any hunting conditions in the line while automatically maintaining a substantially constant voltage thereon.

More specifically stated, it is an object of my invention to provide, in conjunction with the above-mentioned asynchronous machines, apparatus for simultaneously adjusting the wattless component and maintaining a substantially constant speed thereof under various operating conditions.

Other and more specific objects of my invention will become evident from the following detailed description taken in conjunction with the accompanying drawings, wherein Figure 1 is a diagrammatic view of a transmission system organized in accordance with my present invention and employing one form of regulating apparatus for the desired purpose, and Fig. 2 is a similar view of a modification of the system that is shown in Fig. 1.

Referring to Fig. 1, the system here shown comprises a relatively high-voltage, long-distance transmission line, preferably of the three-phase type, embodying conductors 1, 2 and 3, which may be supplied with energy at various points from suitable steam or hydraulically driven generator stations that are regulated for constant voltage, such as the illustrated main station 4.

At points spaced along the system, in accordance with the principles set forth in the above-identified copending application, a plurality of substations, two of which, 5 and 15, are illustrated, are connected across the line. Each substation may comprise a suitable step-down transformer 6, which is connected to an asynchronous machine, such as an induction motor 7, with which is electrically and mechanically associated a polyphase commutator machine or frequency changer 8, an auxiliary regulating machine or pilot motor 9 and a regulator 10 associated therewith, for purposes to be hereinafter described.

The secondary winding 11 of the step-down transformer 6 is connected to the primary or stator winding of the induction motor 7, and the secondary or rotor winding 12 of the latter is provided with a plurality of slip-rings 13. The polyphase commutator machine or frequency changer 8 is of the type requiring no stator windings and is preferably mounted on the same shaft as the rotor 12. The frequency changer is provided at one end with a commutator 16, upon which a plurality of suitable brushes 17 bear, the brushes being respectively connected to the slip-rings 13. At the other end of the frequency changer 8, a plurality of slip-rings 18 are provided, which are respectively connected to the sections of an adjustable polyphase transformer 19 having a plurality of irregular or unevenly spaced taps, whereby a suitably variable voltage, other than a straight-line function of the angular movement of the brushes 17, may be impressed upon the slip-rings 18 from the secondary transformer winding 11, as will subsequently be described.

The speed of the induction motor 7 should be kept constant in order to prevent the introduction of low-frequency fluctuations on the transmission line. At the same time, it is necessary to vary the wattless energy delivered to the line by the induction motor, in order to control the voltage of the line, as explained in the above-mentioned Baum patent.

It is well-known, in the design of variable-speed induction motor sets comprising a low-frequency energy-translating means in circuit with the secondary winding of the induction motor, that the speed of the motor is controlled by the in-phase voltage component and that the wattless currents are controlled by the other voltage component. Thus, referring to applicant's drawing, when the brushes 17 are in such position as to allow the induction motor to operate at the power factor which it would normally have if the auxiliary machine 8 were replaced by a pure resistance device, the voltage of the auxiliary machine, when the brushes are in the said position, determines the amount of slip of the main induction motor 7. The auxiliary machine 8 is then absorbing utility-power-factor energy from the secondary winding 12 of the main machine 7. When the brushes 17 of the auxiliary machine are shifted from the unity-power-factor position indicated above, the voltage appearing at the brushes will be out of phase with the above-mentioned in-phase component which controls the speed of the main motor, and hence the voltage at the brushes must be increased by such amount as to keep the in-phase voltage component constant.

The auxiliary machine or pilot motor 9 is preferably a small induction motor having a three-phase stator winding 20 and a squirrel-cage rotor winding 26. The rotor of the auxiliary machine 9 may be mounted upon a suitable shaft 21, one end of which is coupled to the rotatable arms or taps of the transformer 19, and the other end of which is provided with a pinion 22 for meshing with a gear-wheel 23, which is mechanically secured to, and suitably insulated from, the brushes 17 of the frequency changer 8. The stator winding 20 of the auxiliary machine is intermittently energized in either forward or reverse phase-sequence, from the secondary transformer winding 11, as hereinafter more fully described. In this way the voltage impressed upon the slip-rings 18 of the frequency changer and the position of the brushes 17 thereof, may be simultaneously varied, to thereby correspondingly vary the amount of leading or lagging energy furnished to the transmission line by the main induction motor 7.

The unequal spacing of the taps of the variable transformer 19 is necessitated in order that the simultaneous adjustment of the transformer and the brushes 17 by the same pilot motor 9 may not affect the in-phase voltage of the secondary winding 12 of the main motor 7, thus maintaining a substantially constant speed while varying the wattless currents supplied to the line by the motor 7.

For the purpose of maintaining a substantially constant voltage at the terminals of the induction motor 7 and, therefore, upon the high tension line at the substation 5, the auxiliary machine 9 is automatically operated, at intervals, in the one direction or the other, by means of a suitable reversing switch 25 having a "forward," a "neutral" and a "reverse" position, in accordance with usual practice. The reversing switch 25 may be either electrically or mechanically controlled by a relay 27, which is provided with corresponding positions, as indicated on the drawing, and has an actuating coil energized in accordance with the secondary transformer voltage. Thus, as the line voltage increases or decreases above or below the predetermined value, the corresponding upward or downward operation of the relay 27 electrically controls the respective illustrated actuating coils of reversing switch 25 to effect operation of motor 9, brushes 17 and the taps of transformer 19 in the one or the other direction, for the purpose mentioned above. It will be understood that any other suitable type of regulator may be employed for this purpose, and therefore no further description thereof is deemed necessary.

In order to obtain the desired voltage regulation of the transmission line without introducing any low frequency fluctuations therein, it is preferable to operate the asynchronous machine 7 at a definite percentage below the synchronous speed. However, this predetermined speed should be maintained substantially constant, which is the purpose of the hereinabove-described regulating means.

As set forth in the above-mentioned Baum patent, the wattless power supplied to the transmission line by the main motor 7 must be adequate to carry the charging current and control the voltage along the line itself and to maintain the stability of the system for through power-transmission along the line from no load to peak load, such line-regulation for through transmission being dominant over whatever local regulation is employed in power-supply or load circuits on the line.

The system shown in Fig. 2, has certain advantages over that shown in Fig. 1, in that smaller currents are carried by various portions of the regulating apparatus, which may, therefore, be smaller in size and less expensive than the corresponding control elements in the system of Fig. 1.

The system illustrated in Fig. 2 comprises the generating station 4 for supplying energy to the transmission line, conductors 1, 2 and 3, and a single substation 30. It will be understood that any suitable number of such substations will be provided, as previously mentioned. The substation apparatus comprises the induction motor 7, and the regulating machine or pilot motor 9 and regulator 10, together with a separately driven auxiliary polyphase commutator machine 31, a relatively small frequency changer 32 for exciting the commutator machine 31, the frequency changer 32, like the frequency changer 14 described above, being mounted on the shaft of the main induction motor, and a small auxiliary synchronous machine 33 for transferring energy from the polyphase machine 31 to the transmission line 1, 2, 3.

The commutator machine 31 comprises a rotatable armature winding 34, having a commutator 35, upon which a plurality of suitable brushes 36 bear, the brushes being respectively connected to the slip-rings 13 of the main machine 7, and a polyphase stator exciting winding 37. A polyphase transformer has its primary winding 41 connected across the slip-rings 13, while the several secondary windings 42 are respectively connected in series relation between the three-phase primary or stator windings 37 of the commutator machine 31 and a plurality of brushes 38, which bear upon the commutator 39 of the frequency changer 32. The slip-rings 40 of the frequency changer are connected to the respective sections of the adjustable polyphase transformer 19, as set forth in connection with the system of Fig. 1.

In the system shown in Fig. 2, the frequency changer 32 need only be of a capacity sufficient to supply energy to the stator exciting winding 37 of the polyphase commutator machine 31, while the heavy-current portions of the system may be limited to the armature 34 of the commutator machine 31 and the conductors leading to slip-rings 13 of induction motor 7.

In the present case, the position of the brushes 38 of the frequency changer 32 may be adjusted simultaneously with the operation of the transformer 19, as described in connection with Fig. 1. The auxiliary regulating machine or pilot motor 9 is shown as adapted to simultaneously operate the movable arms or taps of the three-phase transformer 19 and the position of the brushes 38 of the frequency changer 32, for the same purpose as described above.

The electrical interconnection of the frequency changer 32 and the primary exciting winding 37 of the commutator machine 31 with the auxiliary transformer windings 42 serves to maintain the proper phase relations between the machines 31 and 32 with respect to supplying energy to the secondary winding of the main machine 7.

The regulator 10 is provided for the same purpose as described in connection with Fig. 1, while the auxiliary machine 33 is adapted to be driven by the polyphase commutator machine 31 at a fixed speed to feed power directly back to the secondary transformer winding 11. In this system, it will be noted that, since the commutator machine 31 is mechanically independent of the main induction motor 7, the speed thereof may be chosen to best suit the operating conditions thereof independently of the operating characteristics of the main machine.

It will be seen that I have thus provided a system of transmission embodying asynchronous main machines so regulated as to prevent hunting conditions in the line while maintaining a substantially constant voltage thereof.

It will be understood that instead of obtaining the desired regulation by adjusting the brush position and the transformer 19, a combined regulation of transformers 19 and 41 may be used, or transformers 19 and 41 and the brush position may be simultaneously regulated. Moreover, an impedance device may be used in the circuit of stator winding 37 and regulated simultaneously with one or more of the other above-mentioned adjustable devices.

I do not wish to be restricted to the specific circuit connections or arrangements of parts herein set forth, as various modifications thereof may be made within the spirit and scope of my invention. I desire, therefore, that only such limitations shall be imposed as are indicated in the appended claims.

I claim as my invention:

1. In a power-transmission system, the combination with a transmission line, of means for maintaining constant voltage and preventing hunting conditions on said line, said means comprising a substantially unloaded asynchronous machine adapted to be connected to said line, said machine having a wound secondary winding, means for adjusting the phase relation of the currents traversing said secondary winding while maintaining the speed of said machine substantially constant, and electro-responsive means for automatically regulating said adjusting means to effect the maintenance of a substantially constant voltage on said line.

2. A long-distance high-voltage power-transmission system comprising a line connected to power-supply and load circuits and extended beyond the normally inherent stability limits of distance for such a line so connected; and wattless-current generating-means intercepting said line within said stability limits and having such rating and regulation as to be adequate to carry the charging current and control the voltage along the line itself and to maintain the stability of the system for through power-transmission along the line from no load to peak load, such line-regulation for through transmission being dominant over whatever local regulation is employed in power-supply or load circuits on the line; said wattless-current generating means including an induction machine having a wound secondary winding, a low-frequency energy-translating device in circuit with said secondary winding, and means for simultaneously varying the voltage and the phase of said low-frequency device in such manner as to vary the wattless currents supplied to the line by said induction machine while maintaining a substantially constant speed other than synchronous speed.

3. A long-distance high-voltage power-transmission system comprising a line connected to power-supply and load circuits and extended beyond the normally inherent stability limits of distance for such a line so connected; and wattless-current generating-means intercepting said line within said stability limits and having such rating and regulation as to be adequate to carry the charging current and control the voltage along the line itself and to maintain the stability of the system for through power-transmission along the line from no load to peak load, such line-regulation for through transmission being dominant over whatever local regulation is employed in power-supply or load circuits on the line; said wattless-current generating means including an induction machine having a wound secondary winding, a low-frequency energy-translating device in circuit with said secondary winding, means for simultaneously varying the voltage and the phase of said low-frequency device in such manner as to vary the wattless currents supplied to the line by said induction machine while maintaining a substantially constant speed other than synchronous speed, and means responsive to the line voltage for automatically regulating said wattless-current varying means as may be necessary to control the voltage along the line.

4. A long-distance high-voltage power-transmission system comprising a line connected to power-supply and load circuits and extended beyond the normally inherent stability limits of distance for such a line so connected; and wattless-current generating-means intercepting said line within said stability limits and having such rating and regulation as to be adequate to carry the charging current and control the voltage along the line itself and to maintain the stability of the system for through power-transmission along the line from no load to peak load, such line-regulation for through transmission being dominant over whatever local regulation is employed in power-supply or load circuits on the line; said wattless-current generating means including an induction machine having a wound secondary winding, a phase-advancer in circuit with said secondary winding, and means responsive to the line voltage for automatically regulating said phase advancer as may be necessary to cause the said induction machine to deliver wattless currents in the amounts necessary for line-voltage control.

In testimony whereof, I have hereunto subscribed my name this 5th day of December, 1923.

RUDOLF E. HELLMUND.